June 11, 1935.  J. J. DRUMM ET AL  2,004,552
ELECTRIC STORAGE BATTERY
Filed May 17, 1933  2 Sheets-Sheet 1

INVENTORS:
J. J. Drumm +
A. G. Burnell  BY: Marks + Clerk
ATTORNEYS.

Patented June 11, 1935

2,004,552

UNITED STATES PATENT OFFICE 2,004,552

ELECTRIC STORAGE BATTERY

James Joseph Drumm and Albert George Burnell, Inchicore, Dublin, Ireland, assignors to Drumm Battery Company, Limited, Dublin, Ireland Application May 17, 1933, Serial No. 671,540
In Great Britain May 18, 1932

3 Claims. (Cl. 136—28)

This invention relates to alkaline accumulators or electric storage batteries with particular reference to the "Drumm" accumulator as disclosed in Patent No. 1,955,115 dated April 17, 1934.

It is well known in connection with alkaline accumulators sold under the registered Trade Mark "Edison" that certain precautions have to be taken to ensure a long life to the battery notably that the working temperature of the cells must be limited to temperatures below 114° F. in order that the positive plates may not be poisoned by the depositing thereon of iron compounds which at elevated temperatures are produced from the active negative iron powder and are dissolved in the electrolyte in relatively considerable quantity.

The "Drumm" battery uses zinc as the active negative material and no insoluble zinc compounds are precipitated in the positive tubes or in the positive plates of the battery and in consequence the accumulator should have a very long life since poisoning of the positive plates is unlikely and the negative plates are obviously exceedingly long-lived since they consist of nickel or nickel alloy.

Practical experience with the "Drumm" battery however has indicated that some poisoning or deterioration of the positive plates occurs after about 8000 cycles and this was found to be due to the unexpected precipitation and accumulation of ferric oxide on the inside of these plates. Research has shown that the source of the iron poisoning is found in the nickel-plated parts and accurate observations have established that the resistance of nickel-plated steel to electrolytic attack in alkaline accumulators is not complete although it has always hitherto been considered to be so.

The object of the present invention therefore is to overcome this slight drawback noted in connection with the "Drumm" battery as hitherto constructed.

The invention is clearly illustrated in the accompanying drawings, in which:—

Figure 1:
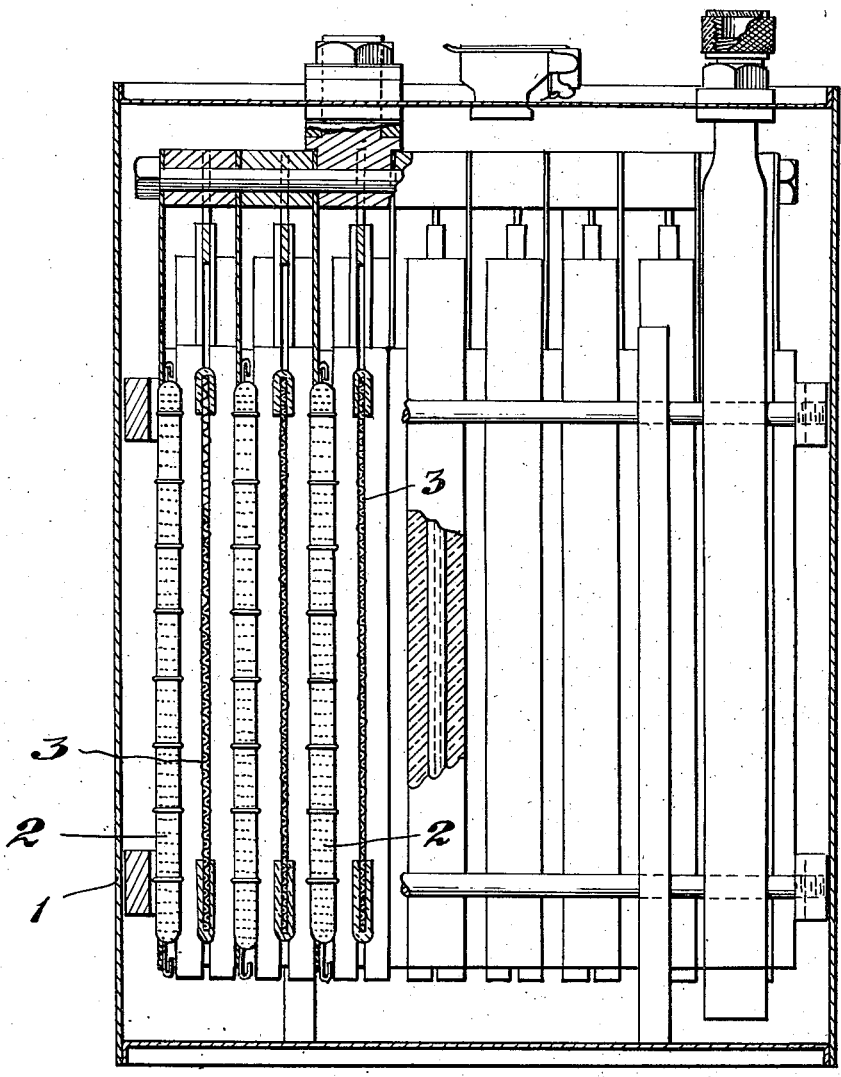
Figure 2:
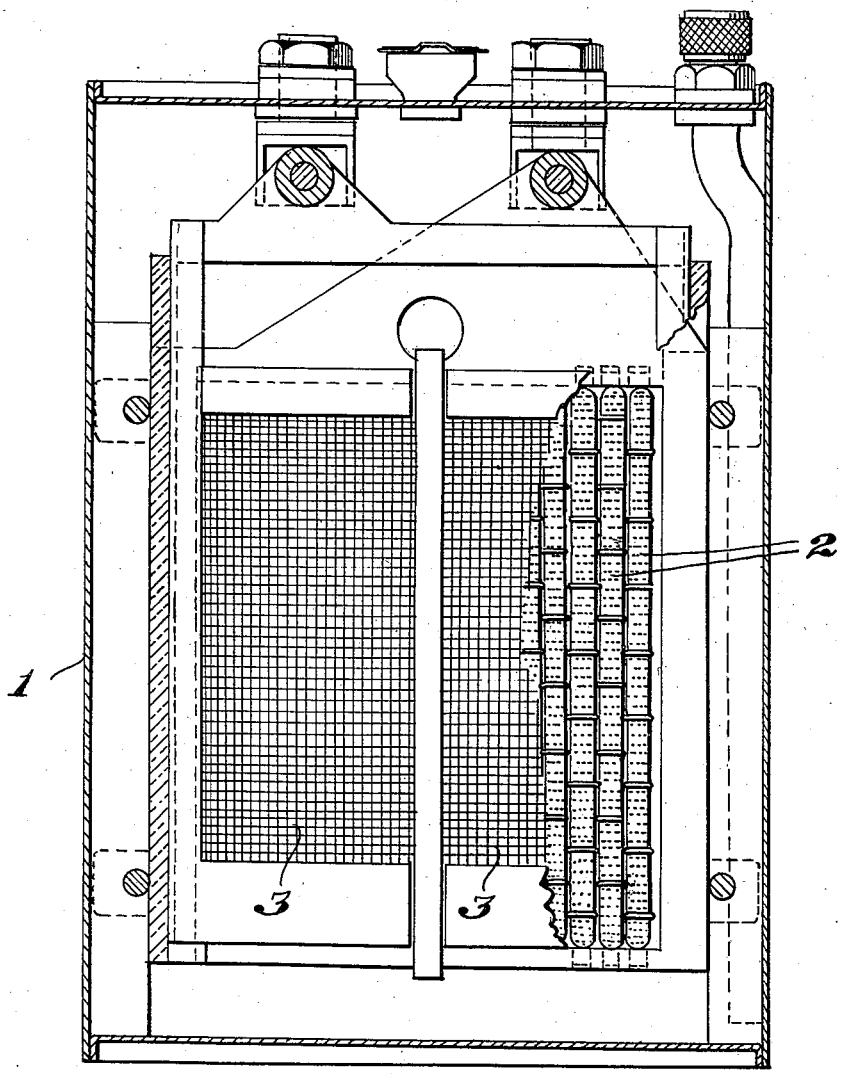

Fig. 1 is a part sectional side elevation of the accumulator in accordance with the invention, and Fig. 2 is part sectional end view of Fig. 1, the part of the negative plate seen in this figure cut away in order to show the positive elements bending it.

With reference to the drawings the battery may be said to consist of an outer metallic casing or container 1 for containing the positive tubes 2 and negative plates 3.

According to the present invention the envelopes or tubes of the positive plates 2 are specially formed or treated in order to prevent the possibility of poisoning taking place. Thus in accordance with the invention we may make such envelopes from stainless or rustless steel strip perforated and nickel-plated to a depth of, say, 2.5 thousandths of an inch on each side, such nickel-plated material being subsequently annealed in a furnace in an atmosphere of hydrogen gas for, say, from 1 to 1½ hours at a temperature of 800 to 900° C., it being understood however that the temperature and time may be suitably regulated to ensure efficient bonding between the iron or steel and the nickel plating.

In a modification we may employ ordinary perforated steel or iron strip, nickel-plated in the usual way, and this we then chromium plate and finally again nickel-plate on top of the chromium surface, the whole being subsequently annealed in hydrogen as above described.

If so preferred cadmium plating may be used instead of chromium plating and cadmium may be employed instead of chromium as an intermediate layer prior to the application of the final nickel coating but in this case the annealing in hydrogen must be carried out at a lower temperature owing to the fact that cadmium has a melting point of approximately 321° C.

For such parts as containers 1 we propose to employ nickel-plated rustless steel with the nickel-plating annealed in hydrogen while for such parts as grids for which it may not be commercially practicable to use pure nickel we form the same of stainless steel nickel-plated to about 3 thousandths of an inch on each side or preferably they are formed of pure high conductivity iron with alternations of nickel and chromium plating as already described, the plating being subjected to annealing in an atmosphere of hydrogen.

By taking the precautions herein outlined the "Drumm" battery should have an indefinite life and, further, where service conditions are particularly heavy it may be operated continuously without any deterioration at temperatures as high as 50° C.

The invention is not to be limited to any particular number of platings adopted for any one part nor to the thicknesses of plating hereinbefore given by way of example as we reserve to ourselves the right to vary these and other details as may be found most advantageous as the result of our practical experience along the lines indicated.

Having now described our invention, what we claim as new and desire to secure by Letters Patent is:—

1. An alkaline electric storage battery comprising a negative electrode having a surface of nickel, an alkaline electrolyte and a positive electrode formed from a composite plate of iron, nickel plate, chromium plate, and nickel plate, the last mentioned plating being annealed in an atmosphere of hydrogen.

2. An electric storage battery in which the envelopes of the positive plates are formed of iron nickel plated and then chromium plated and finally again nickel plated, the last mentioned plating being annealed in an atmosphere of hydrogen at a suitable elevated temperature.

3. An alkaline storage battery comprising a negative electrode plate having a surface of nickel, an alkaline electrolyte and a positive electrode formed from a metal of the iron group with metal platings thereon, the outermost being nickel and annealed in an atmosphere of hydrogen at a temperature between 800° and 900° C. during not over 1½ hours.

JAMES JOSEPH DRUMM.
ALBERT GEORGE BURNELL.